June 30, 1959   E. J. CHANEY   2,892,298
PICKUP DEVICE
Filed Aug. 5, 1957   2 Sheets-Sheet 1

INVENTOR.
Earl J. Chaney
BY Victor J. Evans & Co.
ATTORNEYS

June 30, 1959 — E. J. CHANEY — 2,892,298
PICKUP DEVICE

Filed Aug. 5, 1957 — 2 Sheets-Sheet 2

INVENTOR.
EARL J. CHANEY
BY RICHEY, WATTS, EDGERTON,
McNENNY & FARRINGTON
ATTORNEYS

United States Patent Office 2,892,298
Patented June 30, 1959

2,892,298

PICKUP DEVICE

Earl J. Chaney, Tiffin, Ohio

Application August 5, 1957, Serial No. 677,179

12 Claims. (Cl. 56—314)

This invention relates to agricultural equipment, and more particularly to a pickup device for use with a combine.

The object of the invention is to provide a pickup device which is adapted to be arranged forwardly of a combine or harvester whereby the crops or vegetation will be picked up and guided back to the cutter mechanism of the combine.

Another object of the invention is to provide a pickup device which includes a rod that has its lower end arranged contiguous to the ground whereby as the combine or other implement moves along the ground, the crops will be picked up and guided back into the path of the cutter mechanism so that the crops can be more efficiently severed or harvested, and wherein the pickup device can be readily adapted to harvester platforms regardless of the elevation or height of the harvester platform.

A further object of the invention is to provide a pickup device which is extremely simple and inexpensive to manufacture.

Other objects and advantages will be apparent during the course of the following description.

In the accompanying drawings, forming a part of this application, and in which like numerals are used to designate like parts throughout the same:

Figure 4:
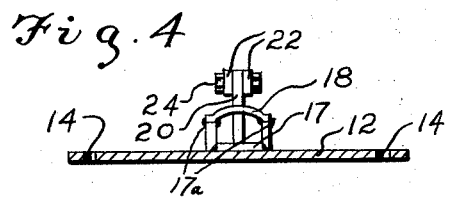
Fig. 4 is a sectional view taken through the rear portion of the pickup device.

Referring in detail to the drawings, the numeral 10 designates a portion of a conventional cutter mechanism which may be arranged forwardly of a combine or harvester, and the cutter mechanism 10 includes the usual pointed guard 11. The present invention is directed to a pickup device which serves to elevate the vegetation or crops into the path of the cutter mechanism 10, and the pickup device of the present invention includes a plate 12 which is mounted below the cutter mechanism 10. The plate 12 is provided with a plurality of spaced apart apertures or openings 14, Fig. 4, and mounting bolts 15 extend through the cutter mechanism 10 and through the apertures 14, there being securing elements 16 arranged in threaded engagement with the bolts 15.

Extending forwardly from the plate 12 and arranged at right angles with respect thereto is a recessed bracket 17 which receives the guard 11 therein. A saddle 18 of curved shape extends across the front portion of the bracket 17 and is secured thereto as by welding 17a. Depending from the bracket 17 and secured thereto is a vertically disposed lug 19, and projecting upwardly from the saddle 18 and secured thereto is a vertically disposed ear 20. A first pair of links 21 have their rear ends pivotally connected to the lug 19 by means of a bolt or pivot pin 23, and there is further provided a second pair of spaced parallel links 22 which have their rear ends pivotally connected to the ear 20 by means of a bolt or pivot pin 24.

A vertically disposed bar 25 is arranged in spaced parallel relation with respect to the lug 19 and ear 20, and the lower end of the bar 25 is pivotally mounted between the pair of links 21 by means of a bolt or pin 26. The upper end of the bar 25 is pivotally mounted between the links 22 by means of a bolt or pin 27. The parts 17, 19, 20, 21, 22 and 25 comprise a parallel motion device or parallelogram.

Extending forwardly from the bar 25 and secured thereto as by welding 25a, is a horizontally disposed arm 28. There is further provided a rod 29 which may be of cylindrical shape, and the rod 29 includes a forwardly arranged downwardly curved portion 30 for engagement with the crops or vegetation to be raised. A brace member 31 extends between the arm 28 and the rod 29 and is secured thereto, as by welding 31a.

Depending from the arm 28 and secured thereto is a leg 32, and a curved brace 33 has its rear end secured to the leg 32, while the front end of the brace 33 is secured to the rod 29. Secured to the brace 33 is a shoe 34 which is adapted to engage the ground as the pickup device moves along in front of the combine. A finger 35 projects rearwardly from the leg 32, and the finger 35 helps prevent weeds, or other foreign matter from becoming entangled in the movable parts of the device.

There is further provided a lip 36 which extends upwardly from the links 21 and is secured thereto, and a coil spring 37 has one end connected to the lip 36, while the front end of the coil spring 37 is connected to the bar 25. The links 21 may be provided with recesses 38 for providing clearance for a bolt 40 which is adjustably mounted in a strap 39, and the strap 39 extends forwardly from the bracket 17. A nut 41 is arranged in threaded engagement with the lower end of the bolt 40.

Figure 1:
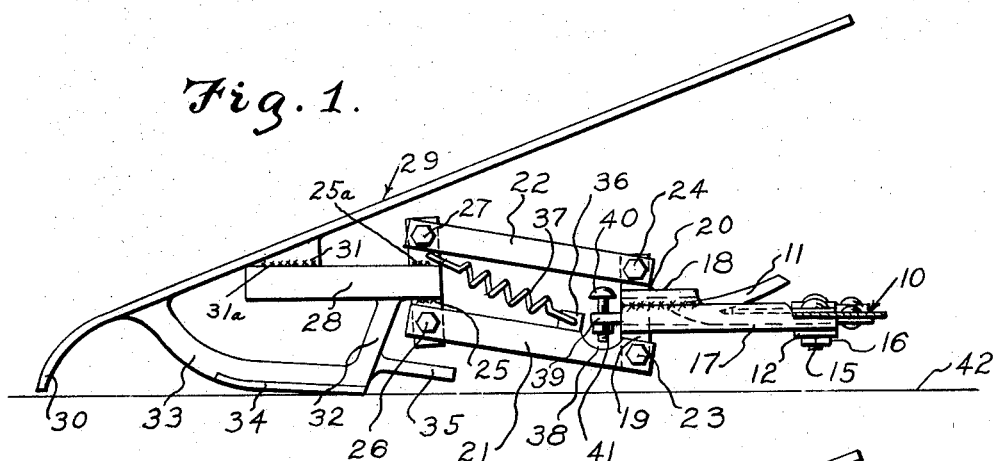
Fig. 1 is a side elevational view, with certain parts broken away and other parts shown in section, of the pickup device shown attached to a cutter mechanism of a harvester or combine, with the cutter mechanism in lowered position.
Figure 2:
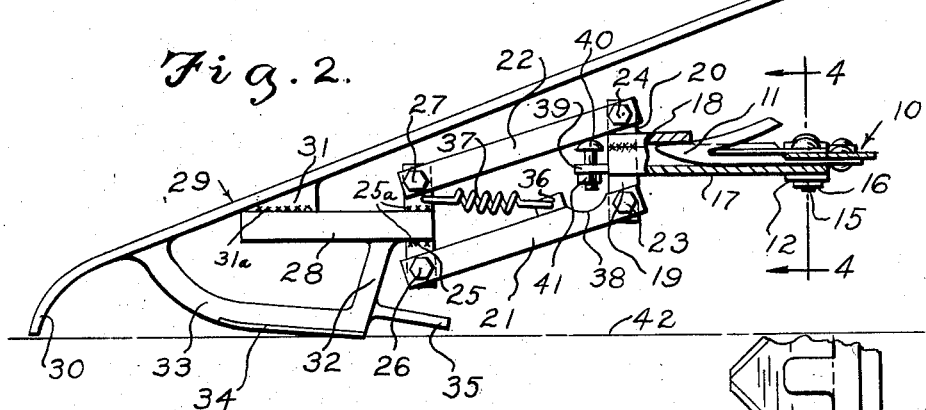
Fig. 2 is a view similar to Fig. 1, but showing the cutter mechanism in raised position.

From the foregoing, it is apparent that there has been provided a pickup device for use with agricultural equipment such as a combine or harvester. In use, one or more of the pickup devices shown in the drawings can be attached to the cutter mechanism 10. Thus, the plate 12 is positioned below the cutter mechanism, and the bolts 15 secure the plate 12 in place below the cutter mechanism. The cutter mechanism can be actuated in any suitable manner. The guards 11 have their front ends projecting into the curved bracket 17 beneath the saddle 18 whereby the pickup device is readily maintained in place. When the pickup device is being used with a cutter mechanism 10 which is arranged at a low level with respect to the ground line 42, the parts are arranged as shown in Fig. 1. However, due to the adjustability of the device, the device can be adjusted so that it can be used with a cutter mechanism 10 which is at a higher level above the ground line 42 as shown in Fig. 2. Thus, the links 21 and 22 cooperate with the bar 25, lug 19, and ear 20 to form a parallelogram and the bolts 23, 24, 25 and 27 serve as pivots about which the parts can move so as to permit the pickup device to fit cutter mechanisms regardless of their elevation.

It is to be understood that different mounting brackets can be used depending upon the type of platform or cutter mechanism with which the device is to be used. Furthermore, it is to be understood that the principle of using the parallelogram suspension can be utilized with other devices. The rod 29 serves to lift or raise the vegetation up and over the cutter bar onto the harvesting platform, and the rod 29 is secured to the brace 33 and to the brace 31 as by welding. The skid shoe 34 provides ample bearing space when sliding over the ground so that the point 30 will be prevented from digging into the ground. The finger or rod 35 prevents trash from accumulating in the area above or rearwardly of the finger 35. The spring 37 tends to hold the runner or shoe 34 against the surface of the ground 42. By means of the adjustment screw 40, the amount of adjustment of the device can be regulated. Regardless of the adjusted postion of the rod 29, the front end 30 will always remain contiguous to the ground 42. The rod 29 will travel beneath the vegetation of the crop being harvested so that this material will slide up over the rod 29 onto the knife bar mechanism 10 and onto the platform. The rod 29 cannot tip down and dig into the ground nor can it tip up and entangle itself in the reel. Furthermore, the rod will not move laterally out of its proper horizontal plane. The principle of using the parallelogram suspension can also be built into gathering points on corn harvesters, sugar beet harvesters, and all harvesters where vegetation is to be gathered into a harvesting machine. Furthermore, this principle can be used in keeping parts of planting equipment in their proper positions when the machine is being operated at different depths or over uneven ground.

Figure 5:
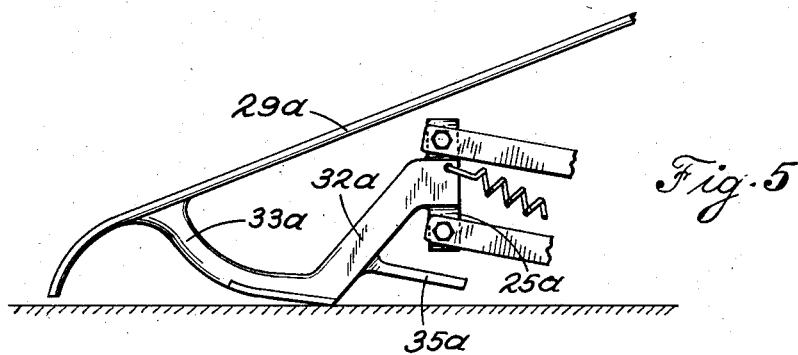
Fig. 5 is a fragmentary side elevational view of a modified form of rod and shoe.

Fig. 5 shows a modified form of the attachment of the lifting rod to the parallel motion means. In this figure the vertical bar 25a is connected to a downwardly and forwardly extending leg 32a and at its lower end is integral with a brace or shoe 33a which, at its forward end, extends upwardly and is attached to the lifting rod 29a. It will be noted that in this modification the lifting rod is not directly connected to the vertical leg 25a after the manner shown in Fig. 1.

Figure 6:
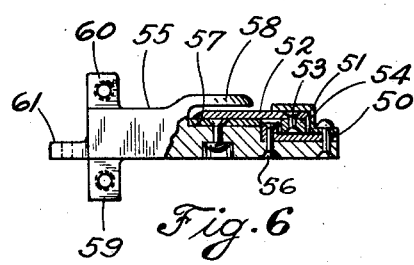
Fig. 6 is a side elevational view, partly in section, of a modified form of means for attaching the pickup device to a cutter bar.

In Fig. 6 is shown a modification of the means for connecting the pickup device to a cutter bar. In this figure the cutter bar 50 supports for relative sliding motion a knife bar 51 having knives 52 attached thereto as by rivets 53. A guard 54 is riveted to the cutter bar 50 and overlies the knives and holds them in position on the cutter bar while the latter is being reciprocated.

Figure 3:
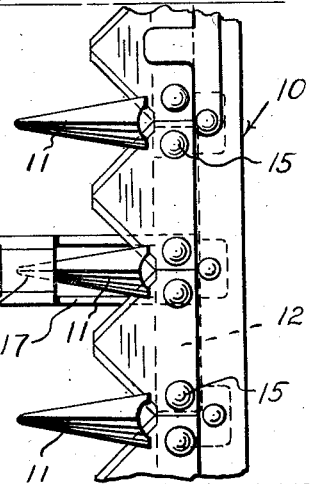
Fig. 3 is a top plan view of the assembly of Figs. 1 or 2.

A metal member 55 serves the dual purpose of guarding some of the knives, as guards 11 of Fig. 3 serve, and also constitutes a means for attaching the pickup device to the cutter bar. This member 55 is connected as by rivets 56 to cutter bar 50, has a ledger plate 57 secured thereto in any suitable manner to operate with knives 52 in the cutting operation, has a guard 58 overlying knives 52 and at its forward end is provided with lugs 59, 60 and 61 corresponding to lug 19, ear 20 and strap 39 of Fig. 2. It will be understood that the parallel motion apparatus of Figs. 1 and 2 may be attached to member 55 by pivotally connecting the lower and upper lengths to lugs 59 and 60, respectively, and employing in lug 61 a means similar to bolt 40 for adjusting the extent of pivotal movement of the links of the parallel motion apparatus.

Figure 7:
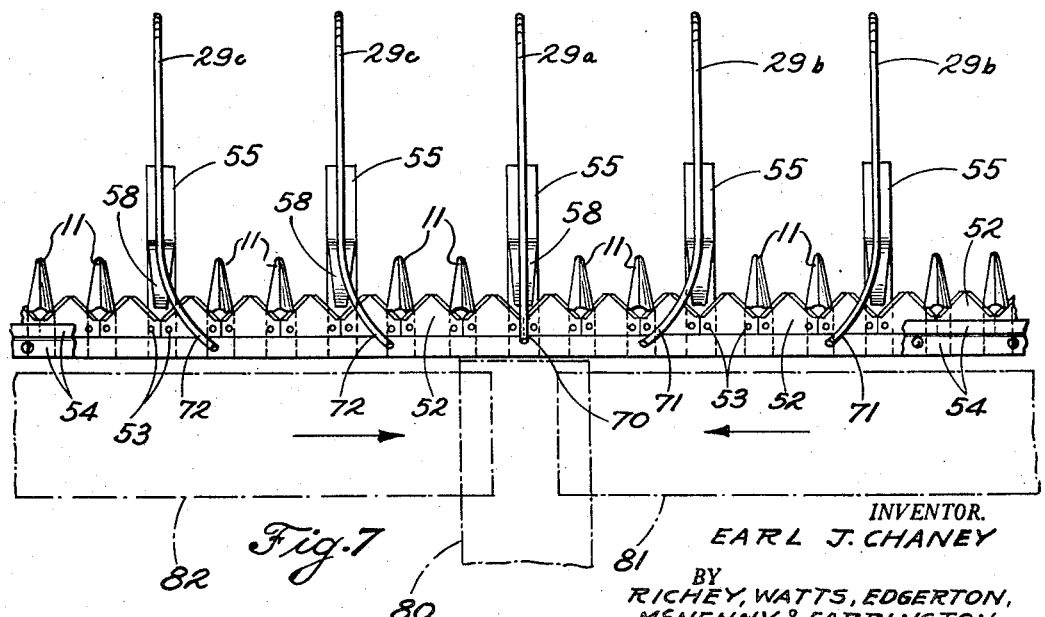
Fig. 7 is a fragmentary, top plan view of a cutter bar equipped with apparatus embodying the present invention for use with loading conveyors.

Fig. 7 shows a fragmentary plan view of a cutter bar equipped with pickup apparatus embodying the present invention and with the lifting fingers suitably shaped to direct the material being cut onto conveyors by which it may be loaded into a following truck. In this figure a plurality of the pickup devices embodying the present invention are attached to the cutter bar at intervals spaced therealong, for example, on every fourth knife guard 11. The trailing end of the lifting finger 29 or 29a which is at approximately the mid-point of the cutter bar is disposed at right angles to the cutter bar as indicated at 70. The trailing ends of the lifting fingers 29b at the right of this middle finger are curved toward the left as indicated at 71 while the ends of the lifting fingers 29c at the left of the central finger are curved to the right as shown at 72.

It will be understood that when lodged material, for example, grain, is being cut by the apparatus illustrated in Fig. 7, the grain will be raised from a more or less horizontal position to an approximately vertical position by the lifting fingers, and, after being cut, will be directed by the trailing ends of the fingers onto endless belt conveyors whence the cut grain may be conveyed to a truck. The middle finger is straight so that the grain moving along it may fall onto conveyor 80 running at right angles to the cutter bar. Grain moving along the curved portion 71 of the lifting fingers on the right side of the middle finger will be deposited on conveyor 81 running toward conveyor 80 parallel to the cutter bar. Similarly grain moving along curved portion 72 of fingers on the left side of the middle finger will be directed toward conveyor 80 and will be deposited on a third conveyor 82 which runs toward the latter conveyor parallel to the cutter bar.

By arranging the pickup devices along the cutter bar and curving the lifting fingers as just described, the loading of the cut material may be facilitated while the lodged grain is being effectively lifted and cut.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. In combination, a cutter mechanism including a pointed guard and a plurality of mounting bolts, a pickup device including a plate arranged below said cutter mechanism and provided with a plurality of apertures for the projection therethrough of said bolts, a recessed bracket extending forwardly from said plate for receiving one of said guards, a curved saddle extending across the front of said bracket and secured thereto, a vertically disposed lug depending from the front end of said bracket, a vertically disposed ear extending upwardly from the front of said bracket, a first pair of links pivotally connected to said lug, a second pair of links pivotally connected to said ear, a vertically disposed bar having its lower end pivotally connected to said first pair of links and its upper end pivotally connected to said second pair of links, an arm extending forwardly from said bar and secured to said bar, a leg depending from said arm, an inclined lifting rod secured to said arm and including a front downwardly curved portion, a curved brace having its front end secured to said rod and its other end secured to the lower end of said leg, and a shoe secured to said brace.

2. In a pickup device, a plate provided with a plurality of apertures, a recessed bracket extending forwardly from said plate, a curved saddle extending across the front of said bracket and secured thereto, a vertically disposed lug depending from the front end of said bracket, a vertically disposed ear extending upwardly from the front of said bracket, a first pair of links pivotally connected to said lug, a second pair of links pivotally connected to said ear, a vertically disposed bar having its lower end pivotally connected to said first pair of links and its upper end pivotally connected to said second pair of links, an arm extending forwardly from said bar and secured to said bar, a leg depending from said arm, an inclined lifting rod secured to said arm and including a front downwardly curved portion, a curved brace having its front end secured to said rod and its other end secured to the lower end of said leg, a shoe secured to said brace, a lip extending upwardly from said first pair of links, and a coil spring having one end connected to said lip and its other end connected to said bar.

3. The structure as defined in claim 2, and further including a strap extending forwardly from said bracket, and an adjustable screw member arranged in engagement with said strap.

4. The structure as defined in claim 2, and further including a finger extending rearwardly from said leg.

5. In combination, a cutter mechanism including a pointed guard and a pickup device secured to said mechanism, said pickup device including a bracket engaging said guard, a lifting rod, ground engaging means therebeneath and near its leading end, said rod extending upwardly and rearwardly from its leading end to above the cutter mechanism, and parallel motion means connecting said bracket to said lifting rod and including substantially parallel links pivotally connected to the brace and to the rod.

6. In combination, a cutter mechanism including a pointed guard and a pickup device secured to said mechanism, said pickup device including a bracket engaging said guard, a lifting rod, ground engaging means therebeneath and near its leading end, said rod extending upwardly and rearwardly from its leading end to above the cutter mechanism, and parallel motion means connecting said bracket to said lifting rod, said means including substantially vertical means connected to said bracket and to said rod and substantially parallel upper and lower links pivoted to the upper and lower portions of said vertical means.

7. The combination of elements set forth in claim 6 in which the vertical means includes a lower lug and an upper ear connected to the bracket and a bar connected to the rod and in which spring means is connected to one link and to the bar.

8. The combination of elements set forth in claim 6 in which adjustable means are carried by the bracket and are engageable with one of said links to regulate the extent of vertical movement of the rod.

9. The combination of elements set forth in claim 6 in which one end of a coiled spring is attached to the upper portion of the bar and the other end is attached to a remote part of the lower link.

10. The combination of elements set forth in claim 6 in which spring means is connected to the upper portion of the bar and to a remote part of the lower link and in which adjustable means is carried by the bracket and is engageable with one of said links to regulate the extent of vertical movement of the rod.

11. The combination of elements set forth in claim 5 in which the said rod is connected only to the leading end of the ground engaging means.

12. The combination of elements set forth in claim 5 in which a plurality of the said pickup devices is attached to a cutter mechanism at spaced intervals therealong and in which the trailing ends of certain of the lifting rods are curved toward the mid-portion of said cutter mechanism.

References Cited in the file of this patent

UNITED STATES PATENTS

| | | |
|---|---|---|
| 658,133 | Ullmann | Sept. 18, 1900 |
| 821,636 | Hamachek | May 29, 1906 |
| 1,942,286 | Harkness | Jan. 2, 1934 |
| 2,214,965 | Love | Sept. 17, 1940 |
| 2,702,980 | Pitner | Mar. 1, 1955 |
| 2,707,365 | Dreker | May 3, 1955 |

FOREIGN PATENTS

| | | |
|---|---|---|
| 16,582 | Denmark | Oct. 18, 1912 |
| 69,700 | Norway | Oct. 29, 1945 |
| 279,197 | Switzerland | Mar. 1, 1952 |